G. R. FLEMING.
CORN PLANTER.
APPLICATION FILED JAN. 20, 1912.
1,042,334.
Patented Oct. 22, 1912.
2 SHEETS—SHEET 2.
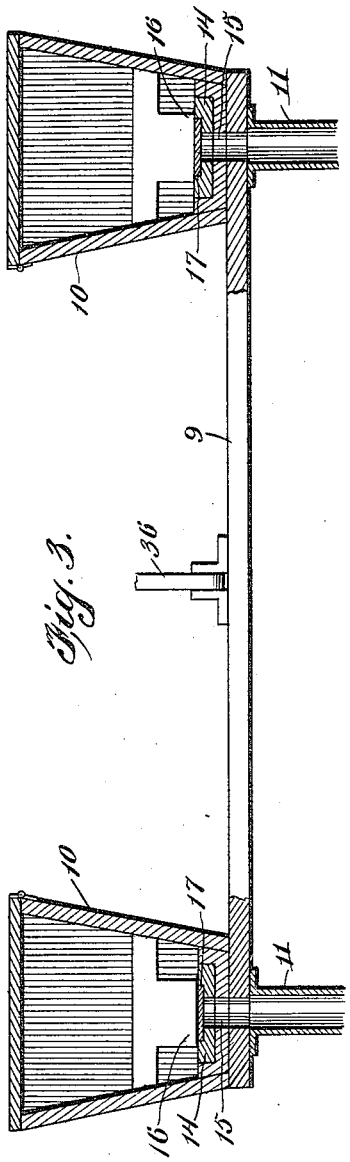
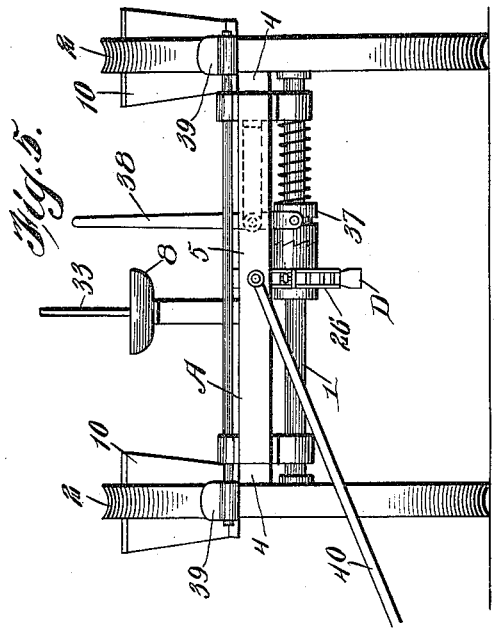
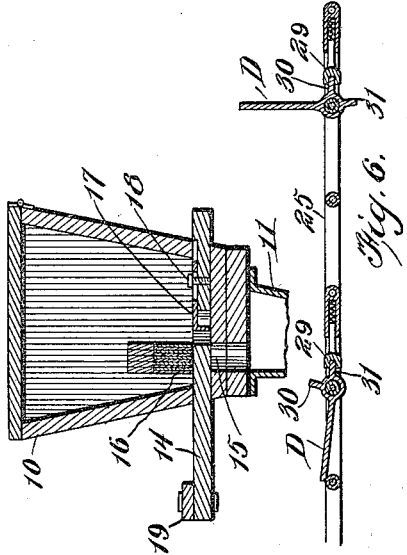
Witnesses
Inventor
George R. Fleming
By Victor J. Evans
Attorney

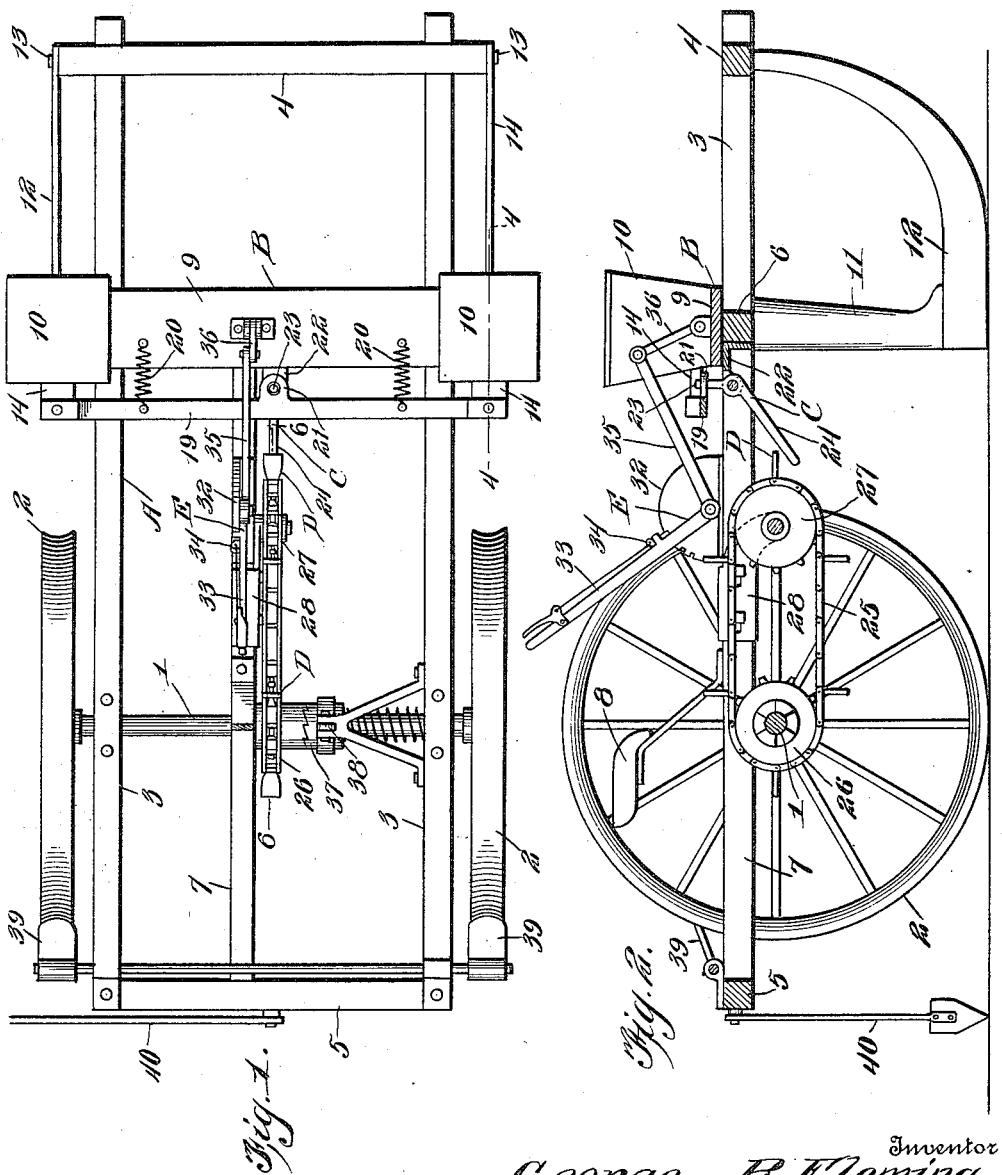

UNITED STATES PATENT OFFICE.

GEORGE R. FLEMING, OF YATES CENTER, KANSAS.

CORN-PLANTER.

1,042,334.     Specification of Letters Patent.     Patented Oct. 22, 1912.

Application filed January 20, 1912. Serial No. 672,399.

*To all whom it may concern:*

Be it known that I, GEORGE R. FLEMING, a citizen of the United States, residing at Yates Center, in the county of Woodson and State of Kansas, have invented new and useful Improvements in Corn-Planters, of which the following is a specification.

This invention relates to that type of corn planters which are known as check row planters, and it has for its object to produce a planter of this class of simple and improved construction which shall be adapted to plant the corn in check rows without the use of a wire stretched across the field for the purpose of actuating the seed dropping mechanism.

A further object of the invention is to simplify and improve the general construction and operation of a planter of this class.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a top plan view of a corn planter constructed in accordance with the invention. Fig. 2 is a longitudinal vertical sectional view of the same. Fig. 3 is a transverse sectional view taken through the runner frame and the seed boxes. Fig. 4 is a sectional detail view taken on the line 4—4 in Fig. 1, longitudinally through one of the seed boxes. Fig. 5 is a rear elevation. Fig. 6 is a longitudinal sectional detail view taken on the line 6—6 in Fig. 1.

Corresponding parts in the several figures are denoted by like characters of reference.

The main frame A of the improved corn planter is supported on an axle 1 having transporting wheels 2, 2 which are fixed thereon, the axle being mounted for rotation in suitable bearings on the frame. The frame which is of rectangular shape comprises the side bars 3, 3, the front and rear bars 4 and 5 and a cross bar 6 which is located relatively near the front bar 4 and which is connected with the rear bar 5 by a longitudinal bar 7 carrying the driver's seat 8.

The runner frame B comprises a frame bar 9 supporting the seed boxes or hoppers 10, 10, each of which has a downwardly extending seed tube 11. The upturned front ends of the runners 12 are pivotally connected by means of pins or bolts 13 with the ends of the front cross bar 4 of the main frame A, said front cross bar being of such length that the ends thereof will project beyond the side bars 3, 3 of the main frame, thus affording sufficient clearance between the ends of the cross bar 4 and the outer faces of the side bars 3 of the main frame for the runners and seed tubes to move freely adjacent to the outer faces of the side bars of the main frame when the runner frame is tilted on the pivots 13.

Reciprocating longitudinally in the seed boxes 10 are the seed slides 14 which may project through the front and rear walls of the seed boxes, each of said seed boxes being provided with a seed aperture 15 which by reciprocating the slide may be brought into or out of registry with the upper end of the seed tube. A cut-off in the form of a brush 16 is fixed in each seed box adjacent to the upper side of the seed slide. Each seed slide is provided with an auxiliary adjusting slide 17 which may be retained in adjusted position by means of a set screw 18 for the purpose of regulating the size of the seed opening or aperture 14.

The rear ends of the seed slides 14 are connected together by a cross bar 19, said cross bar being connected with the frame bar 9 by means of springs 20, whereby said cross bar and the seed slides are normally projected in a forward direction. The cross bar 19 is provided intermediate its ends with a loop or eye 21.

The cross bar 6 of the frame A has a rearwardly extending bracket 22 on which is fulcrumed a bell crank C, one arm of which, 23, extends upwardly through the eye 21 of the spring actuated cross bar 19. The other arm, 24, of the bell crank C is disposed in the path of tappets D associated with a chain 25 which is guided over sprocket wheels, one of which, 26, is mounted on the axle 1, while the other sprocket wheel, 27, is supported for rotation on a bracket 28 which is adjustably connected with the longitudinal bar 7 of the main frame in such a manner that the chain 25 may be readily kept taut. The links composing the chain 25 are to be each of a predetermined length, say one inch, and the tappets D are pivotally associated with as many of such links as may be desired. The tappet members D may be mounted in an outwardly extending position with reference to the chain by means of a suitably constructed spring actuated latch member 29 engaging a projection 30 of said latch member, or the latter may be supported in a downturned position, flat upon the chain by the said latch member engaging another projection 31.

When the machine is in operation the endless chain 25 receives motion from the axle, and the outstanding tappet members D will strike the arm 24 of the bell crank C, tilting the latter and thereby causing the upwardly extending arm 23 of said bell crank to move the connecting bar 19 of the seed slides rearwardly against the tension of the springs 20, thus actuating the seed dropping mechanism. The rod 19 carrying the seed slides is retracted by the springs 20, when the arm 24 of the bell crank is no longer engaged by one of the tappets. By arranging the tappets D in outward projecting position at suitable intervals, the seed dropping mechanism will be actuated at such intervals as may be desired, thereby dumping or depositing seed at such intervals as may have been previously determined upon.

Mounted upon the longitudinal frame bar 7 of the main frame is a lever stand comprising a rack segment 32 on which is fulcrumed a bell crank E, one arm of which, 33, constitutes a handle which is provided with a spring actuated stop member 34 engaging the rack segment. The other arm 35 of the bell crank is connected by a link 36 with the frame bar 9 of the runner frame, which latter may thus be tilted upward or downward to place the runner shoes out of or into engagement with the ground.

A spring actuated clutch 37 operable by a hand lever 38 is mounted on the axle 1 for the purpose of engaging the hub of the sprocket wheels 26, which latter may thus be locked upon the axle for rotation therewith. By disengaging the clutch member 37 from the hub of the sprocket, the latter will become idle upon the axle, and the operation of the seed dropping mechanism will be suspended.

A wheel scraping device 39 and a ground marker 40 are suitably supported upon the rear part of the main frame A, the ground marking device being adapted to be projected at either side of the frame of the machine.

From the foregoing description, taken in connection with the drawings hereto annexed, the operation and advantages of this invention will be readily understood.

The construction is simple and inexpensive, and by the use of this machine corn may be planted in check rows, the hills being located any desired distance apart, or it may be listed or drilled if so required.

Having thus described the invention, what is claimed as new, is:—

1. In a corn planter of the class described, a main frame, a runner frame pivotally connected therewith, seed boxes upon the runner frame, seed slides arranged in the seed boxes for longitudinal reciprocation therein, said seed slides projecting through the rear walls of the seed boxes, a rod connecting the seed slides and having an eye disposed intermediate its ends, springs actuating the connecting rod in a forward direction, a suitably supported bell crank having one arm extending through the eye of the connecting rod, an endless chain having tappets adapted to engage the other arm of the bell crank, and means for operating the endless chain.

2. In a corn planter of the class described having a revolving axle, seed slides supported for longitudinal reciprocation, a spring actuated rod connecting the seed slides and having an eye intermediate its ends, a suitably supported bell crank having one arm extending through and loosely engaging said eye, an endless chain, sprockets supporting said endless chain, one of said sprockets being mounted on the axle of the machine, a bracket adjustable in the main frame and carrying the other sprocket, tappets pivotally mounted on the links of the chain, and means for sustaining said tappets in engaging and non-engaging position with reference to the other arm of the bell crank which is disposed in the path of said tappets.

3. In a corn planter of the class described, seed dropping mechanism including seed slides mounted for longitudinal reciprocation, a spring actuated rod connecting said slides, and a bell crank having one arm extended in engagement with said connecting rod, in combination with an endless chain and supporting and actuating means for the same, said chain having links of predetermined length, and tappet members associated with said links, said tappet members being provided with projections at right angles to one another, and latch means adapted to engage either of said projections to support the tappet members in engaging or non-engaging position with reference to the other arm of the bell crank, one arm of which engages the connecting rod of the seed slides.

In testimony whereof I affix my signature in presence of two witnesses.

GEORGE R. FLEMING.

Witnesses:
W. P. TAYLOR,
C. A. TRUEBLOOD.

Copies of this patent may be obtained for five cents each, by addressing the "Commissioner of Patents, Washington, D. C."